(12) United States Patent
Gulley (10) Patent No.: US 8,083,248 B1
(45) Date of Patent: Dec. 27, 2011

(54) EXTENSION BRACKET

(76) Inventor: Thomas D. Gulley, Monrovia, CA (US)

( * ) Notice: Subject to any disclaimer, the term of this patent is extended or adjusted under 35 U.S.C. 154(b) by 722 days.

(21) Appl. No.: 12/080,187

(22) Filed: Apr. 1, 2008

Related U.S. Application Data (60) Provisional application No. 60/921,545, filed on Apr. 3, 2007.

(51) Int. Cl.
*B62J 25/00* (2006.01)

(52) U.S. Cl. ........ 280/291; 280/163; 180/90.6; 248/688

(58) Field of Classification Search ................ 248/688; 280/163, 291; 180/90.6; 74/564; 296/75
See application file for complete search history.

(56) References Cited

U.S. PATENT DOCUMENTS

| | | | | |
|---|---|---|---|---|
| 1,552,163 A | * | 9/1925 | Huff | 296/75 |
| 4,989,890 A | * | 2/1991 | Lockard et al. | 280/42 |
| 5,090,715 A | * | 2/1992 | Nakajima et al. | 280/166 |
| 6,129,370 A | * | 10/2000 | Hsieh et al. | 280/291 |
| 7,578,117 B2 | * | 8/2009 | Shaffer et al. | 56/17.1 |
| 2005/0179227 A1 | * | 8/2005 | Leitner | 280/163 |
| 2006/0082098 A1 | * | 4/2006 | Harris | 280/304.1 |
| 2006/0103108 A1 | * | 5/2006 | Hunwardsen | 280/291 |
| 2006/0169097 A1 | * | 8/2006 | Peniston et al. | 74/564 |
| 2008/0111345 A1 | * | 5/2008 | Springer | 280/291 |
| 2008/0231013 A1 | * | 9/2008 | Richardson et al. | 280/163 |
| 2009/0072507 A1 | * | 3/2009 | Storer | 280/163 |

* cited by examiner

*Primary Examiner* — Joanne Silbermann
*Assistant Examiner* — Maurice Williams
(74) *Attorney, Agent, or Firm* — Maria Erlinda Co Sarno (57) ABSTRACT

An extension bracket, comprising a front side and a top side, the front side at approximately ninety degrees from the top side; at least two openings on the front side, the two openings at different level from each other, one opening higher or elevated than the other; and, a pivot connector allowing one part to pivot relative to the extension bracket.

17 Claims, 10 Drawing Sheets

EXTENSION BRACKET

This application claims the benefit of U.S. Provisional Patent Application Ser. No. 60/921,545 filed on Apr. 3, 2007.

BACKGROUND

This invention relates to an extension bracket that can be readily installed between existing connectors or between parts.

This bracket may be used for other purposes, however, the usage shown and described herein, to extend the distance of a rider floorboard, hereinafter simply referred to as floorboard, from the main body of a motorcycle, will provide a detailed description of the invention in such a way that would allow those skilled in the art to find other usage for this extension bracket.

Figure 1:
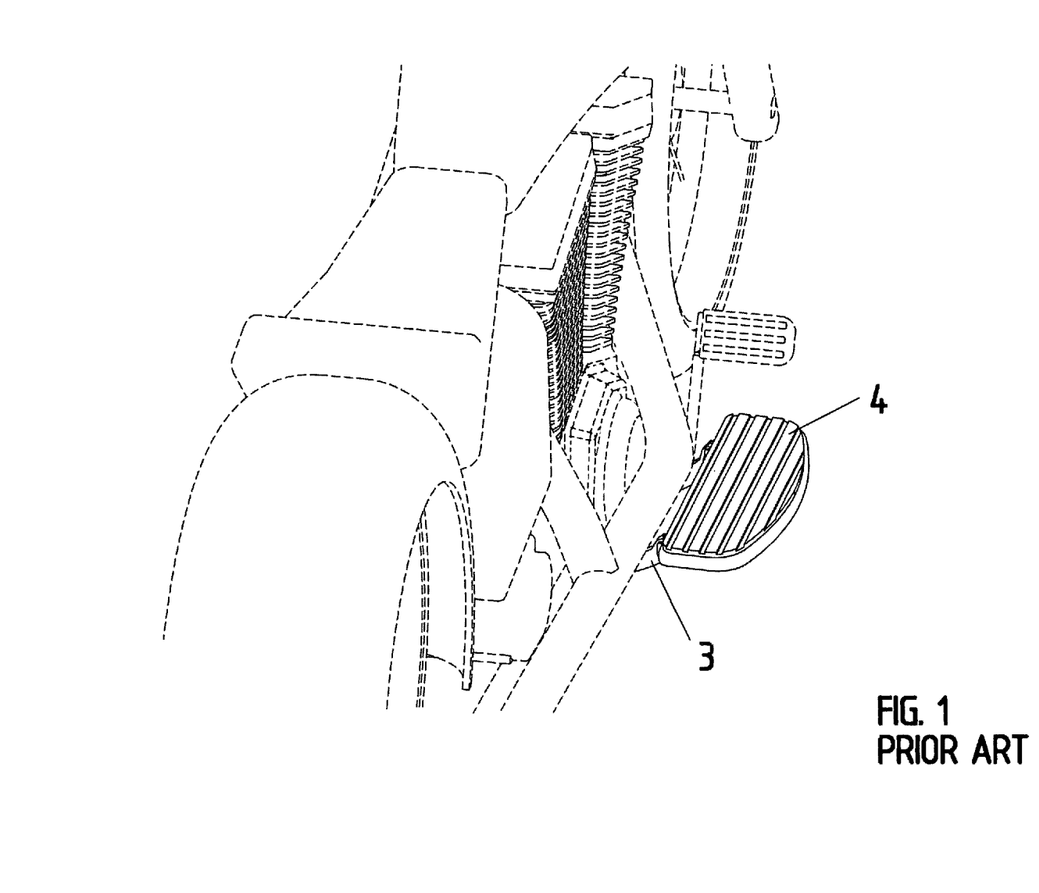
FIG. 1 is a perspective view of a prior art floorboard connecting to the frame of a motorcycle.

Most floorboards of motorcycles are mounted on a frame that are too close to the motorcycle as shown in FIG. 1, for example, Models FLST and FL motorcycles manufactured and/or sold by HARLEY-DAVIDSON®. Specifically in these models, the exhaust pipe is close to the floorboard. Consequently, the emitted heat is an inconvenience to the rider and can also damage a rider's footwear. Additionally, the positioning of the floorboard close to the body of the motorcycle also causes strain on the rider's knees because these are forced to position close to each other which results in an uncomfortable ride. The addition of an upright shield as shown in U.S. Pat. No. D455,375 S only prevents the footwear to come in direct contact with the exhaust pipe but does not ease the strain on the knees. In a motorcycle, when a rider turns abruptly at a reasonably high speed or leans heavily on one side, these conditions hereinafter referred to simply as abrupt turn, the floorboard should tilt upward when it touches the road to prevent the floorboard from scraping the road and eventually lose the balance on the motorcycle.

There is therefore a need for an extension bracket that will not deter the floorboard from tilting upwards when a rider takes an abrupt turn and at the same time protect the foot or the lower parts of the leg from touching the exhaust pipe. The extension bracket disclosed here makes this possible through the positioning or location of the openings in the bracket and the positioning of a pivot connector like a shoulder bolt on a particular opening of the extension bracket.

It is an object of the invention to provide a simple extension bracket between adjoining parts that would allow tilting of one part in relation to the other.

It is also an object of this invention to provide an extension bracket that will position a floorboard of a motorcycle away from the exhaust pipe.

It is a further object of the invention to extend the floorboard of a motorcycle away from the main body so that the feet of a rider are farther apart from each other, putting the knees at ease, thereby providing a comfortable ride.

It is also a further object of this invention to provide an extension bracket that can be easily installed into existing standard or aftermarket floorboards without needing modifications to existing motorcycles.

SUMMARY OF THE INVENTION

The invention relates to an extension bracket for adjoining parts, allowing the tilting of one part relative to the other part. The extension bracket has one end connecting to one part and an opposite end connecting to the other part and comprises a front side and a top side, the front side connecting perpendicularly with one lateral peripheral side of the top side resulting in a front side that is approximately ninety degrees from the top side; at least two openings on the front side, one opening elevated in position relative to the other; and, a pivot connector allowing a part to pivot relative to the extension bracket. The extension bracket, also referred to herein simply as bracket, has special application for extending or positioning the floorboard away from the frame and consequently, the exhaust pipe or the main body of a motorcycle. The extension bracket after connecting with the floorboard, allows this to tilt or pivot by using a pivot connector like a shoulder bolt. One end of the top side of the extension bracket connecting perpendicularly to the front side having one of the openings, situates on top of a flat top edge surface of the frame, and this opening is aligned with an opening on the frame which may be pre-existing. Both openings accommodate a connector connecting the frame on one end of the extension bracket. The connector connecting the frame to the extension bracket is a fixed connector which disallows rotational movement of the frame relative to the extension bracket under normal conditions. Normal conditions means here that the motorcycle is running straight, leaning on either side or turning at any speed so long as the floorboards are not touching the surface of the road or ground. The fixed connector allows limited rotational movement only when subjected to excessive pressure or extraordinary gravitational forces such as on a very abrupt turn after the floorboard has already tilted upwards to a maximum. The floorboard usually touches the surface of the road or ground on this occasion. The opposite end of the extension bracket having the elevated opening inserts into a connector located below a bottom surface of the floorboard and the elevated opening is aligned with the opening on the connector to connect the floorboard with the extension bracket. The connector joining the floorboard with the extension bracket is referred here as the pivot connector which allows the floorboard to pivot or tilt relative to the extension bracket and consequently with the frame on the main body of the motorcycle. For better balance and stability, the connector located below the bottom surface of the floorboard is recommended to be a pair of parallel connectors having a pair of aligned openings, a top surface, a lateral exposed surface and a bottom surface. There can be more than one pair of parallel connectors placed at the bottom surface of the floorboard. The floorboard usually have two pairs of parallel connectors for better performance. Here, the end of the extension bracket having the elevated opening inserts between the pair of aligned openings of the parallel connectors and aligns with the top surfaces of the parallel connectors. The range of pivot relative to the extension bracket is controlled by an amount of clearance between the top side of the extension bracket and the bottom surface of the floorboard, the clearance allowing the floorboard to tilt upwards to a maximum of approximately 45 degrees from the road when the edge of the bottom surface touches the top side of the extension bracket. Tilting, rotation and pivot are used here interchangeably.

One opening of the two openings on the front side of the extension bracket is usually bored midway from the top and bottom edges of the front side and the other opening of the two openings on the front side of the extension bracket is bored at a higher position than the midway opening and is also referred to herein as the elevated opening. The distance between the two openings vary according to the length of the extension bracket. The elevated opening is connected with a connector located below a bottom surface of a floorboard of a motorcycle and the bracket connects with the floorboard by a pivot connector. The front side of the bracket can have any shape depending on the shape of the connector, the floorboard and/or the frame to which it attaches to. It can be rectangularly shaped or one end can be tapered while the other end is rectangularly shaped. Rectangularly shaped means the side is basically rectangular that has been modified to have pointed shaped lateral sides as shown in the figures or arched. The tapered end is usually positioned proximal to the connector at the floorboard where the pivot connector is placed.

Aside from the bracket just having two sides, it can have a back side connecting perpendicularly with one lateral peripheral side of the top side opposite the peripheral side of the top side connecting perpendicularly with the front side, thereby forming a U-shape. The back side provides additional support between the extension bracket and the adjoining part. The back side of the extension bracket need not match the front side but the back side may extend only up to a portion of the front side and/or have an arched contoured lateral side around the elevated opening connecting with the pivot connector allowing one part to pivot relative to the extension bracket. When the connector at the floorboard is a pair of parallel connectors, the end of the extension bracket having a back side is usually connected to the pair of parallel connectors having a pair of aligned openings which is usually located below a bottom surface of the floorboard. Here as in the two sided bracket, the top side of the extension bracket also inserts between the pair of aligned openings of the parallel connectors and aligns with the top surfaces of the parallel connectors. As in the above, the shape of the back side can vary and this can match or not match with the front side. The portion of the extension bracket having a back side is usually tapered and the other portion of the extension bracket without a back side is usually rectangularly shaped as defined above. The tapered end may be U-shaped or made of a solid material.

This extension bracket having at least two openings on one side, one opening at one level and another opening elevated in position relative to the other opening and a pivot connector allowing the floorboard to pivot relative to the extension bracket and the frame of a motorcycle to avoid scraping the floorboard against the road on abrupt turns is used for extending the distance between the floorboard and the frame of the motorcycle, comprising the steps of a) positioning a top side of the extension bracket having the opening at one level on top of a flat top edge surface of the frame having an opening; b) aligning the opening of the extension bracket of step a) with the opening on the frame and connecting these two openings with a fixed connector; c) positioning an end of the extension bracket having the elevated opening into a connector located below a bottom surface of the floorboard and aligning the elevated opening with an opening of the connector; and, d) connecting the elevated opening and the opening at the connector located at the floorboard with the pivot connector allowing the floorboard to pivot relative to the extension bracket. The connector located below the bottom surface of the floorboard can be a pair or a plurality of pairs of parallel connectors. In this case, the end of the extension bracket having the elevated opening inserts between two aligned openings of the pair of parallel connectors and aligns a top side of the extension bracket having the elevated opening with the top surfaces of the pair of parallel connectors.

Other embodiments of the present invention will become readily apparent to those skilled in the art from the following detailed description, wherein it shows and describes only certain embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWING

Aspects of the present invention are illustrated by way of example, and not by way of limitation, in the accompanying drawings, wherein.

DETAILED DESCRIPTION OF THE INVENTION

The detailed description represented herein is not intended to represent the only way or the only embodiment in which the claimed invention may be practiced. The description herein is provided merely as an example or examples or illustrations of the claimed invention and should not be construed as the only way or as preferred or advantageous over other embodiments or means of practicing the invention. An extension bracket connecting two parts with a connector allowing one part to pivot relative to the extension bracket and consequently the other part as described herein is within the scope of this invention. The detailed description includes specific details to provide a thorough understanding of the claimed invention and it is apparent to those skilled in the art that the claimed invention may be practiced without these specific details. In some instances, well known structures and devices are lightly lined and shaded in order to avoid obscuring the main concepts of the invention.

The use of the terms "comprise", "comprises", "comprising" and the like means that a collection of objects or parts is not limited to those objects or parts specifically recited.

Figure 1A:
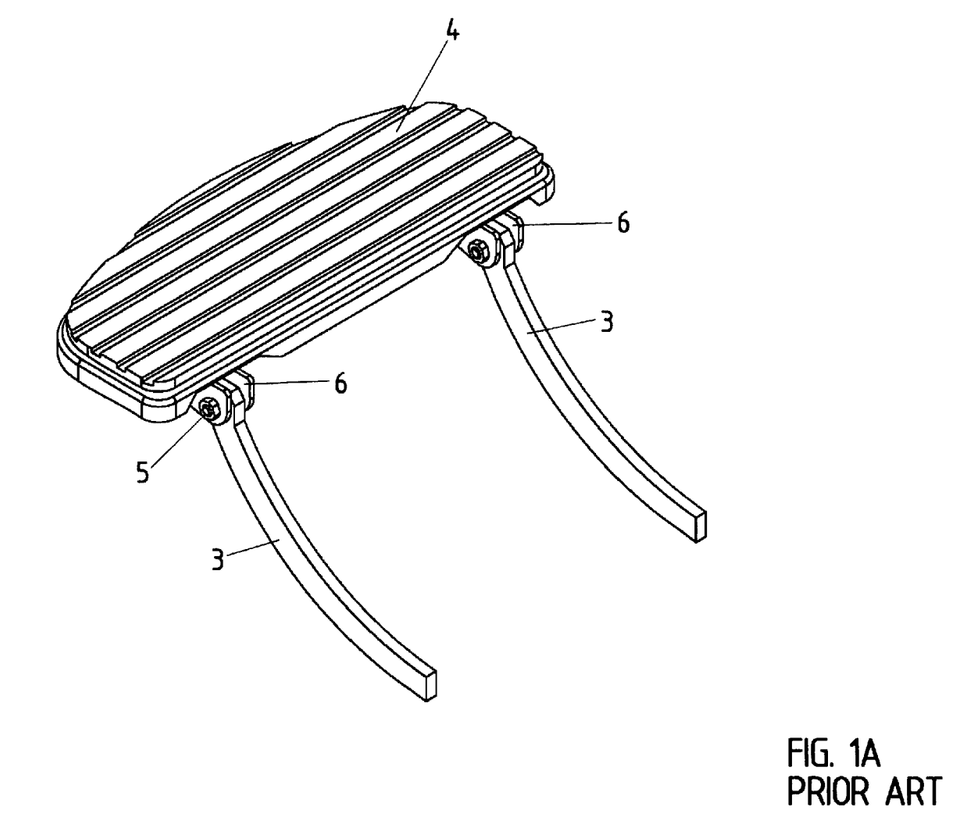
FIG. 1A is an enlarged perspective view of the prior art floorboard shown in FIG. 1 isolated from the motorcycle.
Figure 1B:
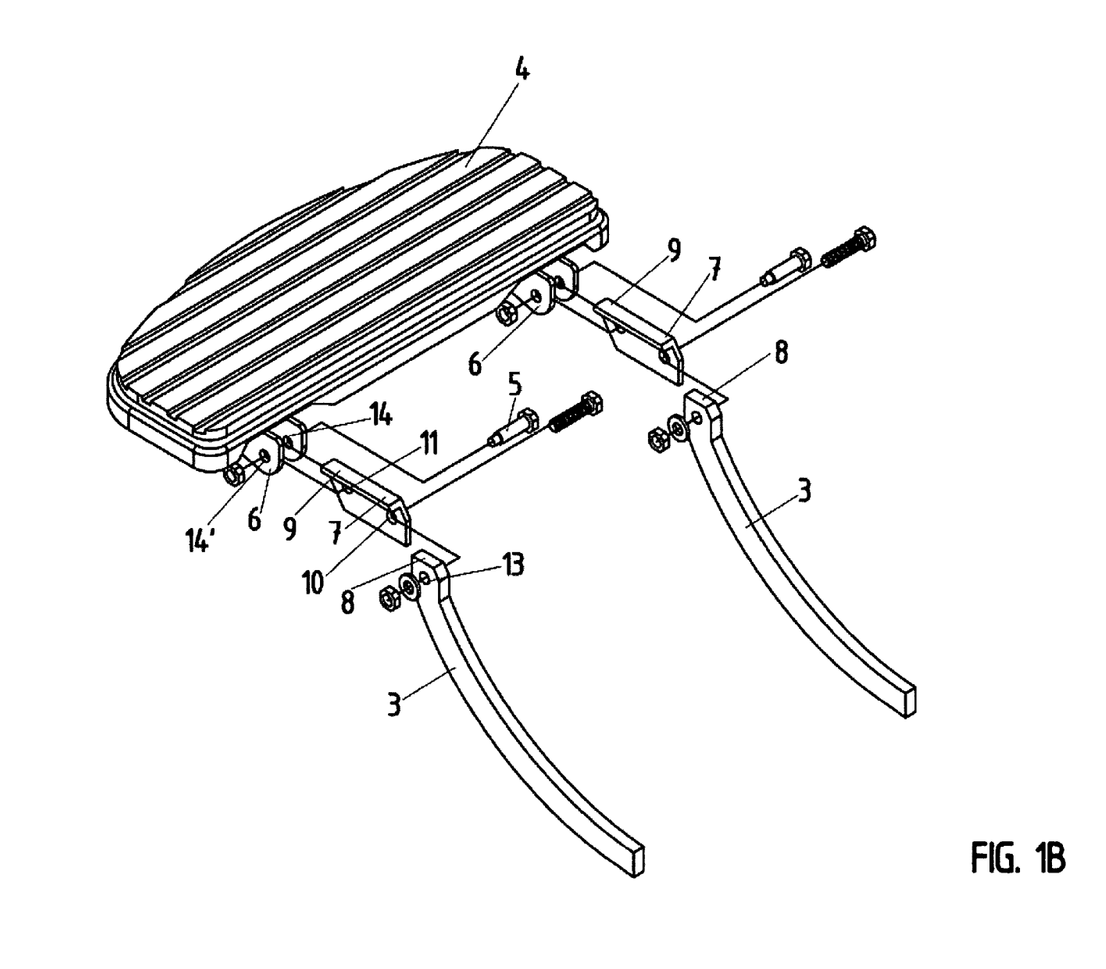
FIG. 1B is a perspective view showing how the extension bracket with a rectangularly shaped front side connects to the frame and the floorboard.
Figure 1C:
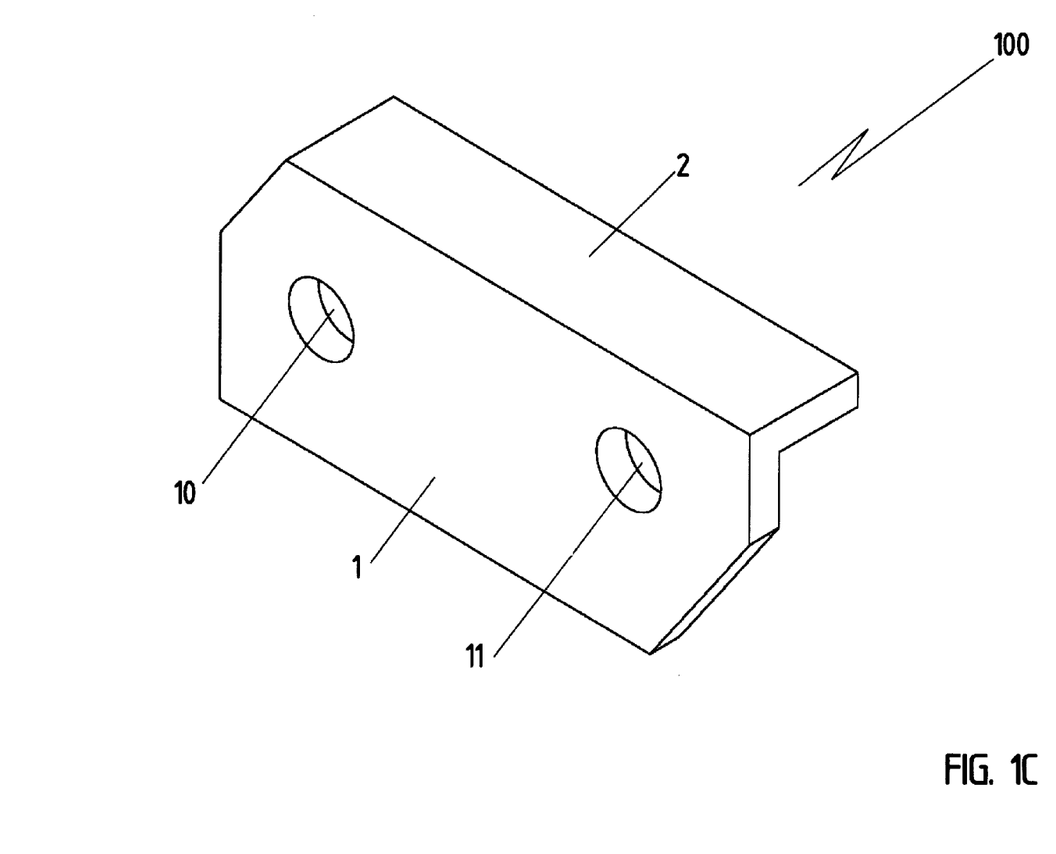
FIG. 1C is a perspective view of the extension bracket with a rectangularly shaped front side having openings at different levels.
Figure 1D:
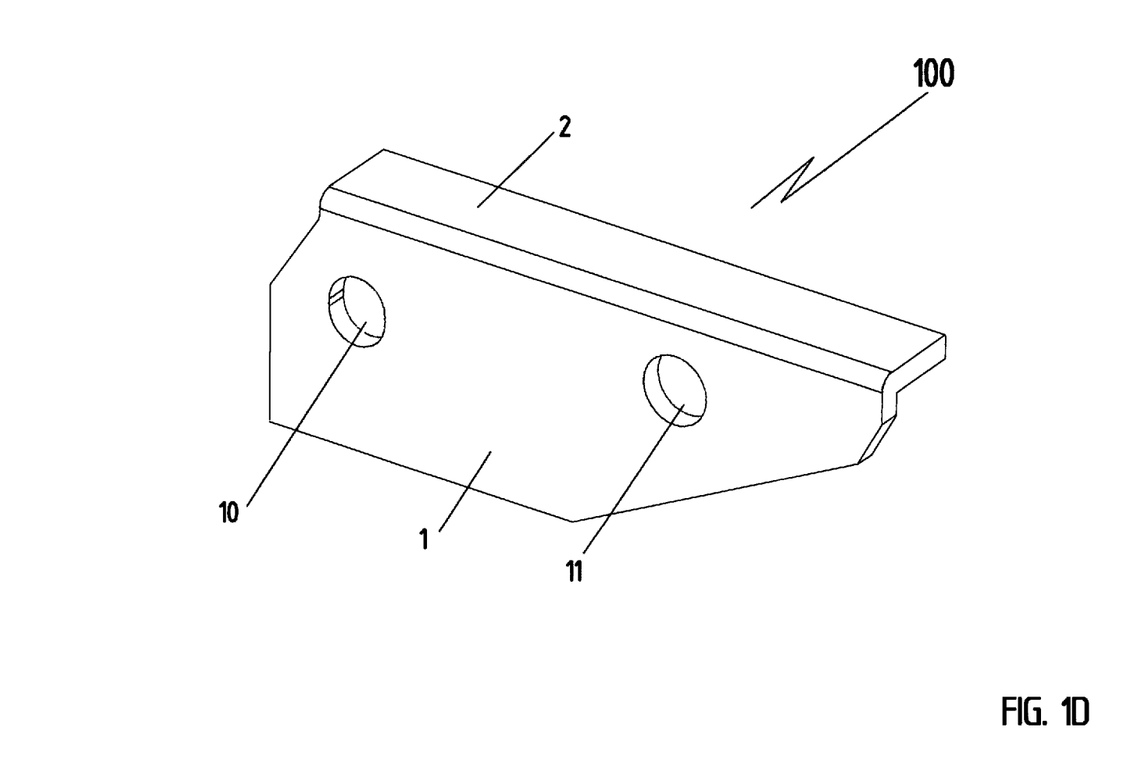
FIG. 1D is a perspective view of the extension bracket with a front side having one end tapered and another end rectangularly shaped, also having openings at different levels like that of FIG. 1C.
Figure 1E:
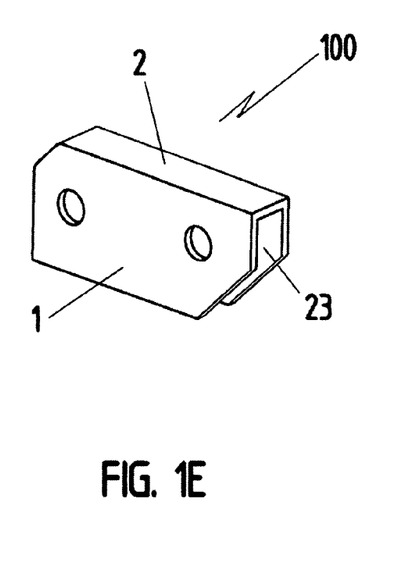
FIG. 1E is a front perspective view of the extension bracket with a front and back side.

FIGS. 1B-1H show the features of the extension bracket 100. The bracket as shown in FIGS. 1B, 1C, and 1D have two sides, a front side 1 and a top side 2. The top peripheral edge of the front side 1 connects perpendicularly with one lateral peripheral edge of the top side 2, that is, the front side is approximately at ninety degrees from the top side. To place or insert the extension bracket 100 between the frame 3 and the floorboard 4 of the motorcycle as shown in FIG. 1B, the shoulder bolt 5 originally connecting the frame 3 and the floorboard 4 shown in FIG. 1A is unfastened. In the example shown here, the floorboard 4 has two pairs of parallel connectors 6 connecting to two frames 3 as shown in FIGS. 1A and 1B for good balance and stability. Other motorcycles or parts needing an extension may have a different design for the frame, floorboard and the connectors. Consequently, the extension bracket has to be modified accordingly as long as the intended function for this bracket does not change.

Figure 4:
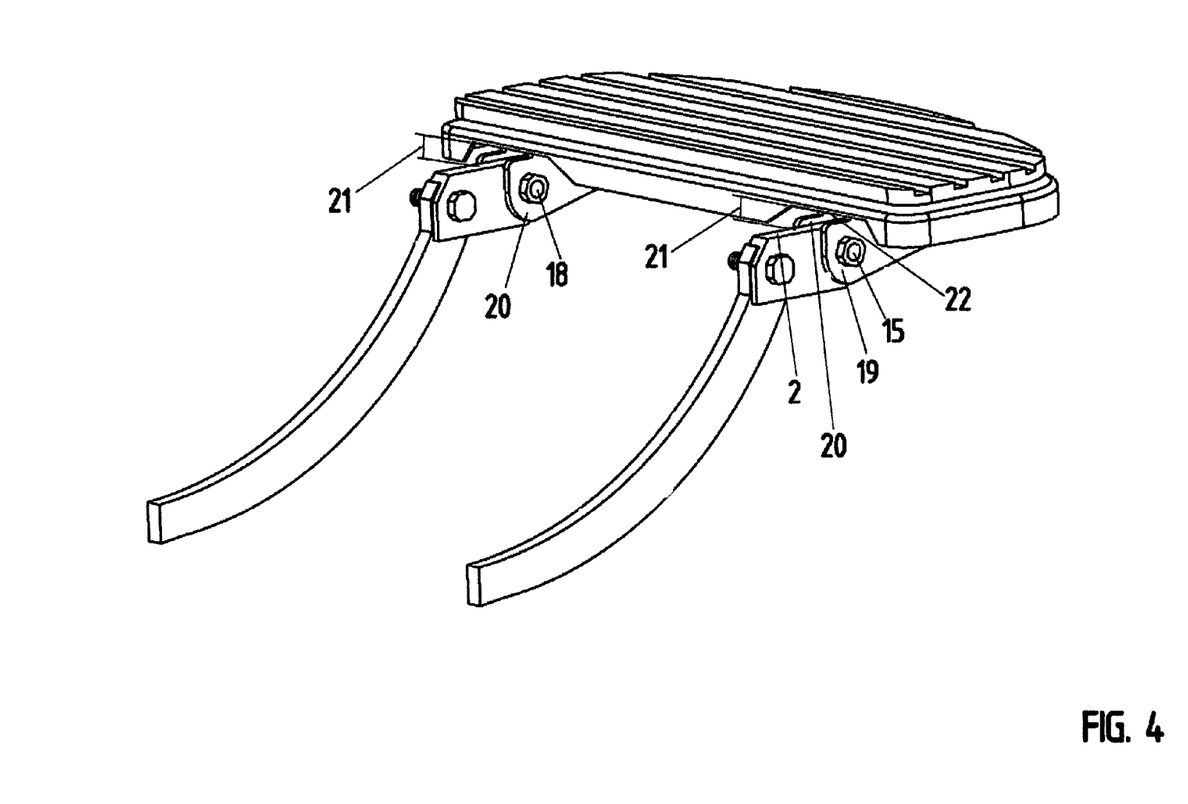
FIG. 4 is a perspective view of the area where a shoulder bolt connects to a parallel connector and shows the clearance between the bottom surface of the floorboard and the top side of the extension bracket.

The description of the installation of the extension bracket will be detailed using the example illustrated herein using only one of the extension bracket because the other one connects similarly. Also, only one floorboard will be mostly used for illustration, either the left or the right floorboard. Each extension bracket is placed between the frame and the floorboard by placing one end 7 of top side 2 of the extension bracket 100 on top of the flat top edge surface 8 of the frame 3 and aligning a first opening 10 of the extension bracket with the pre-existing opening of the frame as shown by FIGS. 1B and 4. A new opening can also be bored on the frame if there is no pre-existing opening. The second end 9 opposite end 7 of the extension bracket 100 is inserted between the parallel connectors 6 below the bottom surface of the floorboard 4 with the top side 2 of the extension bracket usually flushed or aligned with the top surface of the parallel connectors and the openings at the parallel connector aligning with the second opening, an elevated opening compared to the first opening of the extension bracket. The connectors at the floorboard need not be parallel connectors so long as the connector has an opening that can pair with the opening of the bracket and still allow the floorboard to tilt or pivot after connection. The connector that allows movement of the part relative to the extension bracket is also referred to as a pivot connector. The extension bracket in FIG. 10, shows the two front openings or openings bored at different levels or height. After extensive trials, it was determined that only brackets with openings at different levels will function for all the intended purpose stated herein. Brackets with openings at the same level were also initially prepared along with the brackets with openings at different levels. After usage, the brackets with openings at the same level did not perform well. One opening on a side proximal to one end of the extension bracket is usually bored midway from the top and bottom edges of the front side 1 of the extension bracket, hereinafter, midway opening 10, while the other opening is bored at a higher position, more proximal to the top edge of the front side 1 at a side proximal to the opposite end of the extension bracket, hereinafter, elevated opening 11, as shown in FIG. 1C. When placing this extension bracket between the frame and the floorboard, the side with the elevated opening 11 is positioned farther from the frame or near the floorboard while the side with the midway opening 10 is positioned near the frame. Other ways of positioning the openings will also not work well.

Figure 2:
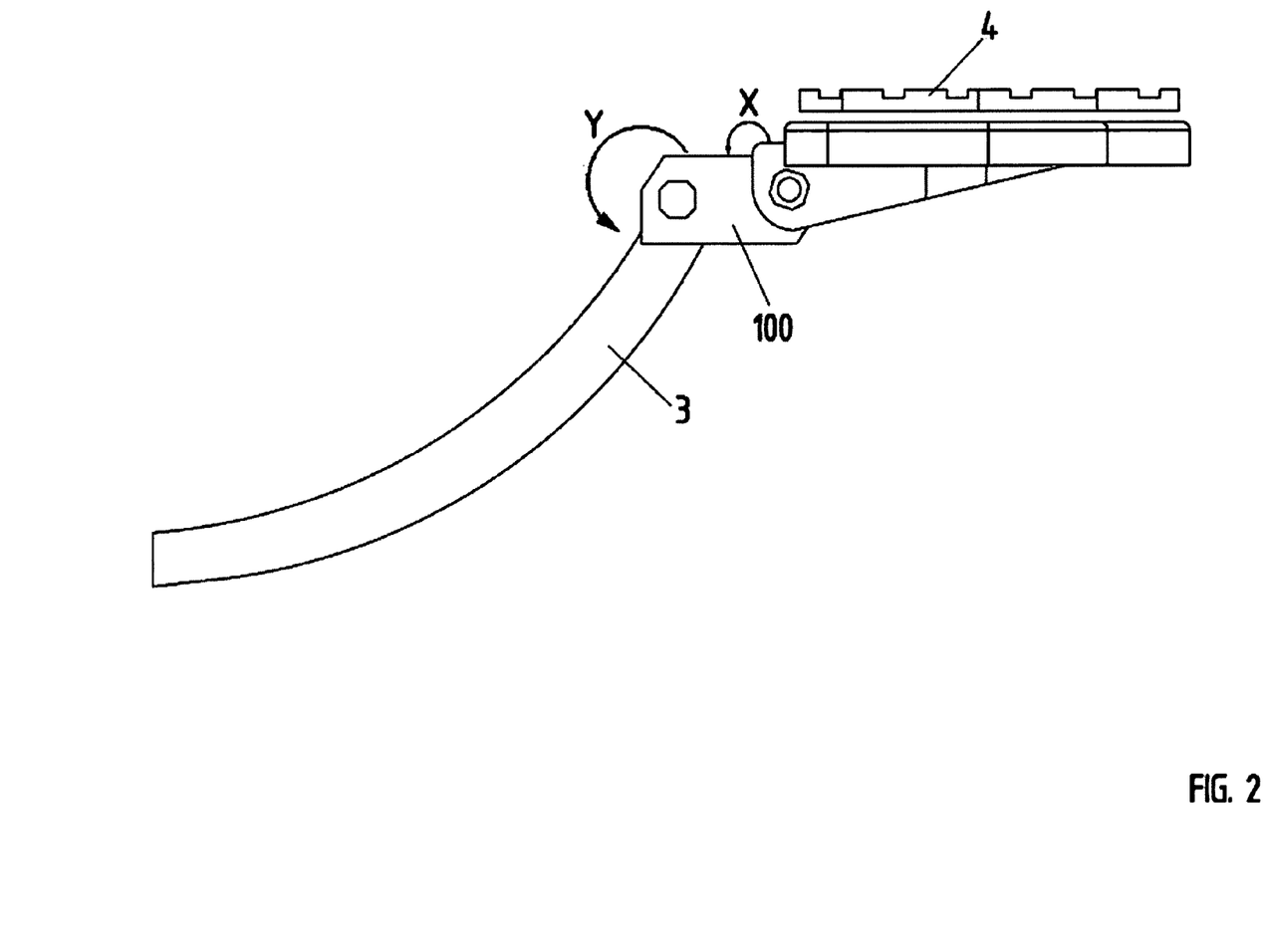
FIG. 2 is a side view showing the frame connected by the extension bracket of FIG. 1C to the floorboard.
Figure 3:
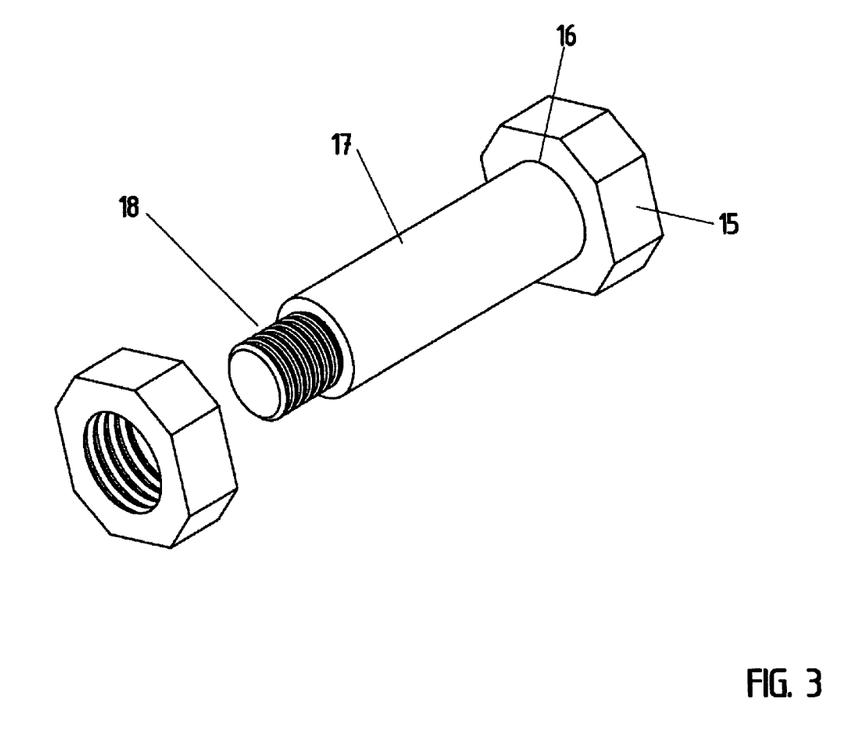
FIG. 3 is a perspective view of a shoulder bolt.

The extension bracket can be used with existing or after market motorcycles. Here the pre-existing shoulder bolt, an example of a pivot connector, is unfastened and used to connect one end of the bracket with the parallel connectors 6 of the floorboard using the elevated opening 11 while the opening 10 at the other end of the bracket is used to connect the frame 3 with the bracket 100 by a fixed connector 12, for example, by a nut and bolt or a fully threaded screw, introduced through the midway opening 10 and the pre-existing opening 13 on the frame 3. This fixed connector under normal conditions does not allow the extension bracket to pivot or rotate at this point in relation to the frame 3 unless so much top or bottom pressure is applied at the fixed connector which usually occurs when a user cycling at a high speed, makes a very sharp and abrupt turn. Other equivalent fixed connectors can be used here so long as it does not allow the extension bracket to pivot at this connection point under normal conditions. The shoulder bolt 5 unfastened from the pre-existing opening 13 of the frame 3 is introduced through the pre-existing opening 14 at one member of the parallel connector 6, into the elevated opening 11 and through the other opening 14' at the other member of the parallel connector 6 as shown in FIG. 18. A nut is used to fasten the shoulder bolt 5. The shoulder bolt 5 as known in the art is shown in FIG. 3. It has a head 15 connected to one end 16 of a short cylindrical shaft 17 which has at the end opposite the head, a threaded end 18 with a turn diameter smaller than the diameter of the cylindrical shaft 17. When introduced through the extension bracket and the pair of parallel connectors, the head 15 protrudes at the outside surface 19 of one member of the parallel connector 6 while the threaded end 18 with the nut protrudes from the inner exposed surface 20 of the second member of the parallel connector 6, thereby positioning the smooth surfaced cylindrical shaft 17 beneath and between the pair of parallel connectors 6 as shown in FIG. 4. The position of the head 15 and the threaded end 18 can be reversed. The smoothed surface of the cylindrical shaft allows the floorboard to pivot or tilt upwards at this point, as shown by the directional arrow X in FIG. 2, when the rider makes an abrupt turn to prevent the floorboard from scraping the road. The extension bracket places the floorboard farther from the frame. Consequently, the feet is farther from the body of the motorcycle especially the exhaust pipe and this also allows the knees to extend farther at ease through the ride. The extent at which the floorboard pivots upwards as shown by directional arrow X in FIG. 2, is controlled by the amount of clearance 21 between the top side 2 of the extension bracket and the bottom surface 22 of the floorboard as shown in FIG. 4. The clearance should allow the floorboard to tilt to a maximum of approximately 45 degrees. The floorboard is fully tilted at this pivot point when the edge of the bottom surface touches the top side of the extension bracket. Extension brackets shown in FIGS. 1B, 1C, 1E and 1F allows the floorboard to pivot upwards to an extent shown by the arrow X in FIG. 2A. When there is an excessive lean as to cause pressure on the fixed connector, additional pivot in the direction shown by the directional arrow Y in FIG. 2 occurs because the extension bracket is designed to move out of the way rather than be so rigid as to scrape on the road. Extension brackets shown in FIGS. 1D, 1G and 1H allows the additional pivot on the floorboard to the extent shown by arrow Y in FIG. 2A, i.e., these bracket allow the total pivot of X and Y combined. A pivot connector other than the shoulder bolt illustrated here can be used so long as it allows one part to pivot or rotate in relation to the other part.

Figure 1F:
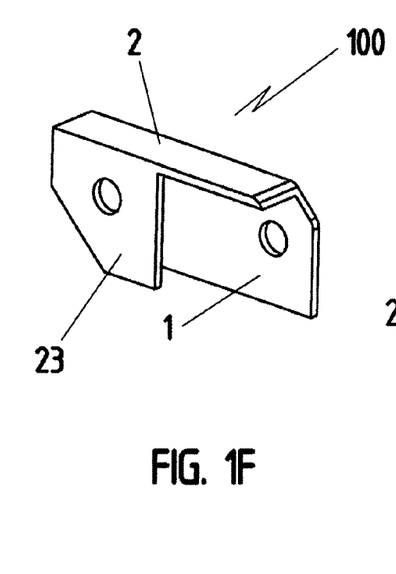
FIG. 1F is a back perspective view of the extension bracket of FIG. 1E showing a back side not extending all the way, covering only the front side portion having the elevated opening, leaving a section of the front side open without a back side.
Figure 1G:
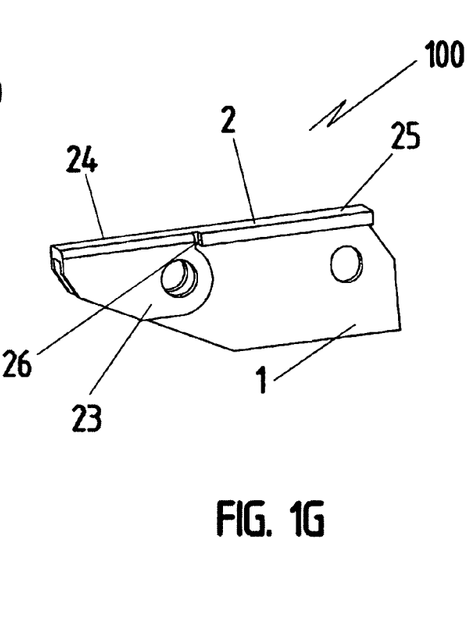
FIG. 1G is a back perspective view of an extension bracket showing a back side of an arched design around the elevated opening different from that shown in FIG. 1F with the back side matching a portion of the front side having the tapered end shown in FIG. 1D.
Figure 1H:
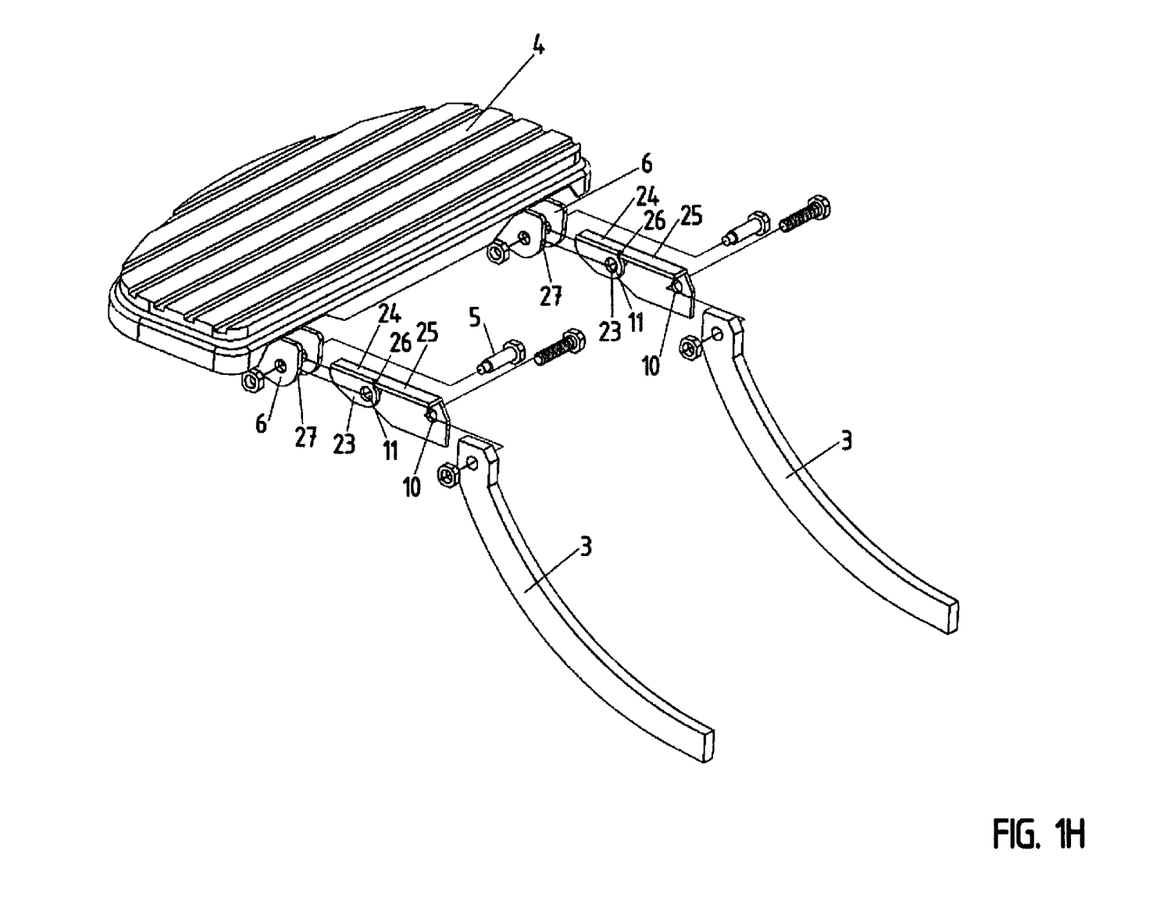
FIG. 1H is a perspective view showing how the extension bracket of FIG. 1G connects to the frame and the floorboard.

The extension bracket shown in FIGS. 1E-1H extends to a back side. One lateral peripheral side of the top side 2, opposite the other lateral peripheral side connecting to the front side 1 connects perpendicularly to another side to form a back side resulting in a U-shape. This modified U-shaped bracket is especially useful for connecting with a parallel connector such as those used in the floorboard example here since there will be an opening on the back side matching the opening on the front side and both openings can be aligned with the openings on the parallel connector. The U-shape should fit entirely inside the parallel connector 6 between the two members of the parallel connector. The additional back side 23 provides additional support for the extension bracket and the floorboard. The back side 23 as shown in FIG. 1F is not a full back side but extends only up to the end portion of the extension bracket connecting to the parallel connectors. Instead of the back side shown in FIGS. 1F and 1G forming a U-shape, the entire end portion of the extension bracket shown connecting to the parallel connector 6 can be made of a solid material. The solid end portion for ease of manufacture covers the area bordered by the back side 23 shown in FIGS. 1F and 1G. The end connecting to the frame 3 is recommended not to have a back side as shown in FIGS. 1F and 1G, leaving at this end, only the original front side 1 and the top side 2.

The dimensions of the extension bracket is dependent upon the size and dimensions of the parts to be extended. The distance between the two front openings 10 and 11 of the extension bracket depends upon the amount of extension desired between the original connecting parts. Further, the top side 2 may have a narrower end 24 where the back side extends downwards from as shown in FIG. 1G. The width of the narrower end depends upon the distance between the two members of the parallel connectors because the extension bracket inserts between them. Consequently, after the bent to form a back side, the top side may be a wider end 25. Because of the difference in width, a protruding edge 26 results at the junction between the narrow 24 and the wide 25 end. This protruding edge 26 should not abut edge 27 of the parallel connectors 6 when the floorboard is connected to the extension bracket because this will resist the pivoting action of the floorboard. Also, the peripheral contours of the bracket should conform with the outside peripheral contours of the parts to which it connects to for aesthetic reasons (see the arching on one lateral side of the back side of FIGS. 1G and 1H to conform with the shape of the parallel connectors).

Gaskets may be placed between the pair of parallel connectors 6 and between metal parts such as between the floorboard connector and the extension bracket to prevent the parts from scratching each other, remove any gaps, and minimize possible rattling from the floorboard.

The extension bracket should be made of rustproof materials especially if it will be subjected to outdoor environment such as its use in motorcycles. Metals and alloys such as aluminum and stainless steel are examples of materials that can be used. Hard plastics can also be used so long as it performs according to the desired function described herein.

While the embodiments of the present invention have been described, it should be understood that various changes, adaptations, and modifications may be made therein without departing from the spirit of the invention and the scope of the claims.

I claim:

1. An extension bracket for adjoining parts, allowing the tilting of one part relative to the other part, comprising:
    one end connecting to one part and an opposite end connecting to the other part,
    a front side, a back side and a top side, the front side connecting perpendicularly with one lateral peripheral side of the top side, the front side at approximately ninety degrees from the top side, the back side connecting perpendicularly with one lateral peripheral side of the top side opposite the peripheral side of the top side connecting perpendicularly with the front side, thereby forming a U-shape extending only up to a portion of the front side, the back side providing additional support between the extension bracket and the adjoining part;
    at least two openings on the front side, one opening elevated in position relative to the other and an opening on the back side extending only up to a portion of the front side aligning with the elevated opening of the front side; and,
    a pivot connector allowing a part to pivot relative to the extension bracket connecting a pair of parallel connectors each having a pair of aligned openings, a top surface, a lateral exposed surface and a bottom surface, located below a bottom surface of a floorboard of a motorcycle with the end of the extension bracket having the elevated opening inserting between the pair of aligned openings of the parallel connectors and aligning with the top surfaces of the parallel connectors before engagement by the pivot connector.

2. The extension bracket of claim 1 wherein the opposite end is connected to a frame of a motorcycle.

3. The extension bracket of claim 1 wherein the front side is rectangularly shaped.

4. The extension bracket of claim 1 wherein the back side of the extension bracket is solid and extends only up to a portion of the front side connecting with the pivot connector allowing one part to pivot relative to the extension bracket.

5. The extension bracket of claim 1 wherein the portion of the extension bracket having a back side is tapered and the other portion of the extension bracket without a back side is rectangularly shaped.

6. An extension bracket for adjoining parts, allowing the tilting of one part relative to the other part, comprising:
    one end connecting to a frame and an opposite end connecting to a floorboard,
    a front side and a top side, the front side connecting perpendicularly with one lateral peripheral side of the top side, the front side at approximately ninety degrees from the top side;
    at least two openings on the front side, one opening elevated in position relative to the other;
    a pivot connector allowing a part to pivot relative to the extension bracket; and,
    one end of the top side of the extension bracket connecting perpendicularly to the front side having one of the openings, situates on top of a flat top edge surface of the frame, the opening on the front side aligning with an opening on the frame and a fixed connector connecting the frame on one end of the extension bracket, the opposite end of the extension bracket having the elevated opening inserting into a connector located below a bottom surface of the floorboard, the elevated opening connecting with an aligned opening on the connector by the pivot connector allowing the floorboard to pivot relative to the extension bracket.

7. The extension bracket of claim 6 wherein the connector located below the bottom surface of the floorboard includes a pair of parallel connectors having a pair of aligned openings, a top surface, a lateral exposed surface and a bottom surface, the end of the extension bracket having the elevated opening inserting between the pair of aligned openings of the parallel connectors and aligning with the top surfaces of the parallel connectors before engaged by the pivot connector.

8. The extension bracket of claim 6 wherein the pivot connector allowing the frame to pivot relative to the extension bracket is a shoulder bolt.

9. The extension bracket of claim 6 wherein the connector connecting the frame to the extension bracket is a fixed connector disallowing rotational movement of the frame relative to the extension bracket under normal conditions, allowing rotational movement when subjected to excessive pressure or extraordinary gravitational forces.

10. The extension bracket of claim 6 wherein the pivot relative to the extension bracket is controlled by an amount of clearance between the top side of the extension bracket and the bottom surface of the floorboard, the clearance allowing the floorboard to tilt upwards to a maximum when an edge of the bottom surface touches the top side of the extension bracket.

11. The extension bracket of claim 10 wherein the maximum is approximately 45 degrees.

12. The extension bracket of claim 6 wherein one opening of the two openings on the front side of the extension bracket is bored midway from a top and bottom edges of the front side and the other opening of the two openings on the front side of the extension bracket is bored at a higher or elevated position than the midway opening, the two openings separated by a distance between the opening on the frame and the opening on the connector of the floorboard.

13. The extension bracket of claim 6 wherein the front side is tapered at one end and rectangularly shaped at the other end, the tapered end positioning proximal to the pivot connector allowing one part to pivot relative to the extension bracket.

14. An extension bracket having one end connecting to a frame and an opposite end connecting to a floorboard of a motorcycle, the bracket allowing tilting of the floorboard relative to the frame, comprising:
   a front side, a top side, and a back side, the back side connecting perpendicularly with one lateral peripheral side of the top side opposite a peripheral side of the top side connecting perpendicularly with the front side, thereby forming a U-shape, the back side providing additional support between the extension bracket and the adjoining part; and,
   at least two openings on the front side, one opening elevated in position relative to the other, at least one opening on the back side matching the elevated opening on the front side, one end of the top side of the extension bracket connecting perpendicularly to the front side having one of the openings situated on top of a flat top edge surface of the frame, the opening on the front side aligning with an opening of the frame and a fixed connector connecting the frame with one end of the extension bracket, the opposite end of the extension bracket having the elevated opening inserting into a connector located below a bottom surface of the floorboard, the elevated opening and the matching opening on the back side connecting with an aligned opening of the connector of the floorboard by a pivot connector allowing the floorboard to pivot relative to the extension bracket, the pivot relative to the extension bracket controlled by an amount of clearance between the top side of the extension bracket and the bottom surface of the floorboard, the clearance allowing the floorboard to tilt upwards to a maximum when an edge of the bottom surface touches the top side of the extension bracket, and the two openings on the front side separated by a distance between the opening on the frame and the opening on the connector of the floorboard.

15. The extension bracket of claim 14 wherein the back side of the extension bracket extends only up to a portion of the front side connecting with the connector located below the bottom surface of the floorboard and the pivot connector allowing the floorboard to pivot relative to the extension bracket, the connector having a pair of parallel connectors with a pair of aligned openings, the end having the elevated opening tapered at one end and rectangularly shaped at the other end, a top side of the tapered end inserting between the pair of aligned openings of the parallel connectors and aligning with the top surfaces of the parallel connectors.

16. A method for extending the distance of a floorboard of a motorcycle from a frame or an exhaust pipe of the motorcycle using an extension bracket having at least two openings on one side, one opening at one level and another opening elevated in position relative to the other opening and a pivot connector allowing the floorboard to pivot relative to the extension bracket thereby tilting the floorboard when it touches the road on an abrupt turn, comprising:
   a) positioning a top side of the extension bracket connecting perpendicularly to a front side having the opening at one level on top of a flat top edge surface of the frame having an opening;
   b) aligning the opening of the extension bracket of step a) with the opening on the frame and connecting these two openings with a fixed connector;
   c) positioning an end of the extension bracket having the elevated opening into a connector located below a bottom surface of the floorboard and aligning the elevated opening with an opening of the connector; and,
   d) connecting the elevated opening and the opening at the connector located at the floorboard with the pivot connector allowing the floorboard to pivot relative to the extension bracket.

17. The method of claim 16 wherein the end of the extension bracket having the elevated opening inserts between two aligned openings of a pair of parallel connectors located below the bottom surface of the floorboard and aligns a top side of the extension bracket having the elevated opening with top surfaces of the pair of parallel connectors.

* * * * *